United States Patent [19]

Bartok

[11] Patent Number: 5,737,553
[45] Date of Patent: Apr. 7, 1998

[54] COLORMAP SYSTEM FOR MAPPING PIXEL POSITION AND COLOR INDEX TO EXECUTABLE FUNCTIONS

[75] Inventor: Peter Dennis Bartok, Springville, Utah

[73] Assignee: Novell, Inc., Provo, Utah

[21] Appl. No.: 502,490

[22] Filed: Jul. 14, 1995

[51] Int. Cl.[6] .............................. G06F 3/14; G06F 3/033
[52] U.S. Cl. ..................... 395/339; 395/348; 395/131; 395/351; 345/145
[58] Field of Search ................................ 395/339, 326, 395/348, 349, 351, 354, 131, 134, 509, 514, 517; 345/145, 153, 199, 186

[56] References Cited

U.S. PATENT DOCUMENTS

| | | | |
|---|---|---|---|
| 4,941,111 | 7/1990 | Sfarti | 395/134 |
| 5,041,992 | 8/1991 | Cunningham et al. | 395/334 X |
| 5,226,109 | 7/1993 | Dawson et al. | 395/141 X |
| 5,287,448 | 2/1994 | Nicol et al. | 395/337 |
| 5,307,457 | 4/1994 | Beitel et al. | 395/348 |
| 5,317,680 | 5/1994 | Ditter, Jr. | 395/354 X |
| 5,371,514 | 12/1994 | Lawless et al. | 345/145 |
| 5,448,688 | 9/1995 | Hemingway | 345/145 |
| 5,526,020 | 6/1996 | Campanelli et al. | 345/145 |
| 5,588,093 | 12/1996 | Harrington | 395/109 |
| 5,590,262 | 12/1996 | Isadore-Barreca | 395/326 X |

OTHER PUBLICATIONS

Boggan, Scott et al. "Developing Online Help for Windows" SAMS Publishing, 1993. pp. 202–221.

Chuang, L.-C. and H. Adeli "Design–Independent CAD Window System Using the Object–Oriented Paradigm and HP X Widget Environment" Computers & Structures, vol. 48, No. 3, 1993. pp. 433–440.

Hardman, Lynda et al. "The Amsterdam Hypermedia Model" Communications of the ACM, vol. 37, No. 2, Feb., 1994. pp. 50–62.

Mandelkern, Dave "GUIs The Next Generation" Communications of the ACM, vol. 36, No. 4, Apr., 1993. pp. 37–40.

Morse, Alan and George Reynolds "Overcoming Current Growth Limits in UI Development" Communications of the ACM, vol. 36, No. 4, Apr., 1993. pp. 73–81.

Tscheligi, Manfred et al. "N/Joy—The World of Objects" Kobe, Japan. Proceedings of the 1991 IEEE Workshop on Visual Languages, Oct., 1991.

Urlocker, Zach "Object–Oriented Programming for Windows" Byte, May 1990. pp. 287–294.

Widjaja, T. Kiki "The Impact of Color coding in Program Debugging" Proceedings of the Human Factors Society 36th Annual Meeting, 1992. pp. 321–325.

*Primary Examiner*—Raymond J. Bayerl
*Attorney, Agent, or Firm*—Madson & Metcalf

[57] ABSTRACT

An apparatus and method for mapping (associating, linking) hot spot objects of arbitrary shape and size to selected portions of an image presentable on a display connected to a computer. A hot spot object is mapped to a color, that may or may not be a color of the object when displayed. A user may designate a display color to be easily visible for presenting a template of hot spot objects. A distinct color for each hot spot object may be identifiable by a number comprised of the red, green, and blue bit numbers of the color. Maps may be stored in a memory device configured to link a template of hot spot objects to a display of pixels, each pixel of the display to a color, and each color to a definition of a functional object, such as an application or executable statement. On a computer, a user may create, select, or open a hot spot object (a graphical object associated with a portion of an overlying image) of arbitrary shape on a display. In indices (maps) a processor may read a pixel number, an associated unique color, and a functional object corresponding to the color.

20 Claims, 7 Drawing Sheets

COLORMAP SYSTEM FOR MAPPING PIXEL POSITION AND COLOR INDEX TO EXECUTABLE FUNCTIONS

BACKGROUND

1. The Field of the Invention

This invention relates to computers and, more particularly, to novel systems and methods adaptable to graphical user interfaces for computers.

4. The Background Art

Computers may be command driven, requiring that a user or a device input specific commands, such as from a keyboard, in order to cause the computer to execute an executable code. Computers may also be menu driven, requiring that a user select a menu item displayed on a screen by moving a pointer to the menu item and actuating a selection mechanism such as by depressing a mouse button (e.g. a "click"), by touching a keyboard character or the like.

A user may access or open a menu item by some distinct actuation, such as depressing a mouse button twice in rapid succession, sometimes referred to as a "double click". A graphical user interface may present images or icons representing functions or physical apparatus in order to remind or prompt a user as to the effect of selecting the icon.

Various images, icons, may be presented to a user. Icons may be colorful, complex, and informative. Unfortunately, the processing necessary by a computer to support such a selection of icons is substantial, and is not only difficult to program, but may be so complex as not to be executable in real time.

Typically, an icon is just a displayed image. In addition to the icon, a rectangle or other regular polygon (usually strictly convex) having a shape coinciding generally with a portion of the icon is defined as a hot spot or active region. A selection by a user of the icon is actually a selection of the underlying invisible polygon. The polygon is usually a simple rectangle since the processing necessary to determine whether a selected point identified by a cursor is within the polygon is very time consuming for the processor of the computer.

Processing time grows dramatically with every additional side, corner, concavity, or other variation of the polygon. Processing is typically so time-intensive that a programmer programs a simple rectangular shape to be the "hot" area.

Object oriented programming facilitates a programmer creating objects having inherent characteristics. Any object of a given type has associated with it certain functions, as well as parameters identifying the condition of the object with respect to each characteristic that the object has.

Some applications allow a user to create graphical objects using drawing or painting features of the application. Each such object may have associated with it an image that may be displayed on a monitor. These graphical objects may be as sophisticated in color, texture, shape, and so forth, as any artwork, photograph, or other picture of a conventional nature. An image may have numerous objects, just as a real scene depicted by an image has numerous, actual, physical objects in it. Convolutions of a graphical object may be complex in shape. Portions of a graphical object may be hidden to a user's view behind other graphical objects, just as physical objects may.

Simple polygonal shapes simply do not facilitate ready mapping of more than a very rudimentary image to underlying hot spots corresponding to portions of, or objects in, the image. Absent a very close mapping of the shape of an image object to a hot spot object, interaction between a user and such objects is limited. Also, a user may be hampered in selecting a poorly fitted hotspot associated with a graphical object.

Moreover, the degree of resolution available for placing and selecting hot spots will be limited by a programmer's patience in creating numerous hot spot objects corresponding to the various shapes (or portions) of an image's graphical objects as well as by the time for processing of the shapes of hotspots to determine the placement location of a cursor (pointer) positioned within the image by a user.

A system is needed for readily creating templates of numerous, distinct, hot spot objects whose shapes match the shapes corresponding to graphical (image) objects virtually exactly. Also needed are an apparatus and method for mapping a graphical object to a hot spot object, such that a determination of whether a cursor is within the hot spot object may be made in real time for an object having an arbitrarily complex shape.

A method and apparatus for creating a series of graphical (image) objects that could be indexed rapidly, yet have a practically unlimited number of objects would be very useful, as would a method and apparatus for creating hot spot objects within and around one another within a single pixel of proximity. A discontinuous object having more than one distinct perimeter would be extremely useful for a "many-to-one" mapping of hot spots to a single definition, executable instruction, functional call, or the like in an executable code.

BRIEF SUMMARY AND OBJECTS OF THE INVENTION

In view of the foregoing, it is a primary object of the present invention to provide an apparatus and method for mapping a graphical object of arbitrarily complex shape to a hot spot object of virtually the same shape.

It is an object of the invention to provide a system for readily creating templates of hot spot objects whose shapes match the shapes of corresponding graphical (image) objects virtually exactly.

It is an object of the invention to provide an apparatus and method for associating or mapping a graphical object to a hot spot object such that a processor of a typical personal computer may more rapidly determine whether a cursor displayed on a monitor is within the hot spot object.

It is an object of the invention to provide an apparatus and method for determining in real time whether a cursor is within a hot spot object associated with and shaped virtually the same as an object having an arbitrarily complex shape.

It is an object of the invention to provide an apparatus and method for creating a series of graphical (image) objects that may be indexed rapidly, and in which such index may access a practically unlimited number of objects.

Another object of the invention is to provide a method and apparatus for creating discontinuous objects surrounding, and within one another, or within a sigle pixel of one another, on an imaging "page."

It is another object of the invention to provide a discontinuous hot spot object having more than one distinct perimeter for a "many-to-one" mapping of hot spot segments to a single functional hot spot, as identified by an index number, call in an executable code, function, or the like.

Consistent with the foregoing objects, and in accordance with the invention as embodied and broadly described herein, a color map system is disclosed in one embodiment of the present invention as including an apparatus and method for mapping (associating, linking) hot spot objects of arbitrary shape and size to selected portions of an image presentable on a display connected to a computer. A hot spot object may be mapped to a color, that may or may not be a color of the object when displayed. That is, a user may designate a display color to be easily visible for presenting a template of hot spot objects.

However, a distinct color for each hot spot object may be identifiable. The distinct color may be associated with or distinguished by a number or color code. The color code may be comprised of the red, green, and blue bit numbers of the color.

Maps may be stored in a memory device configured to link a template of hot spot objects to a display of pixels, each pixel of the display to a color, and each color to a definition of a functional object, such as an application or executable statement. On a computer, a user may create, select, or open a hot spot object (a graphical object associated with a portion of an overlying image) of arbitrary shape on a display.

In indices (maps) a processor may read a pixel number linked to a location on the screen of a display associated with the template presented on the display. The processor may then read from the same or another map or index in a memory device that pixel number and an associated unique color.

From the same or a different map or index in memory, the processor may then locate a designation of a functional object corresponding to the color. The processor may then select and open the functional object in response to an appropriate designation by a user. For example a user may click or double-click a mouse button while a cursor is positioned at a pixel within the hot spot object to launch a functional object mapped to a color, and selected by a user designating a pixel mapped to the color.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but it is merely representative of certain presently preferred embodiments of the invention.

The presently preferred embodiments of the invention will be best understood by reference to the drawings, wherein like parts are designated by like numerals throughout.

Figure 1:
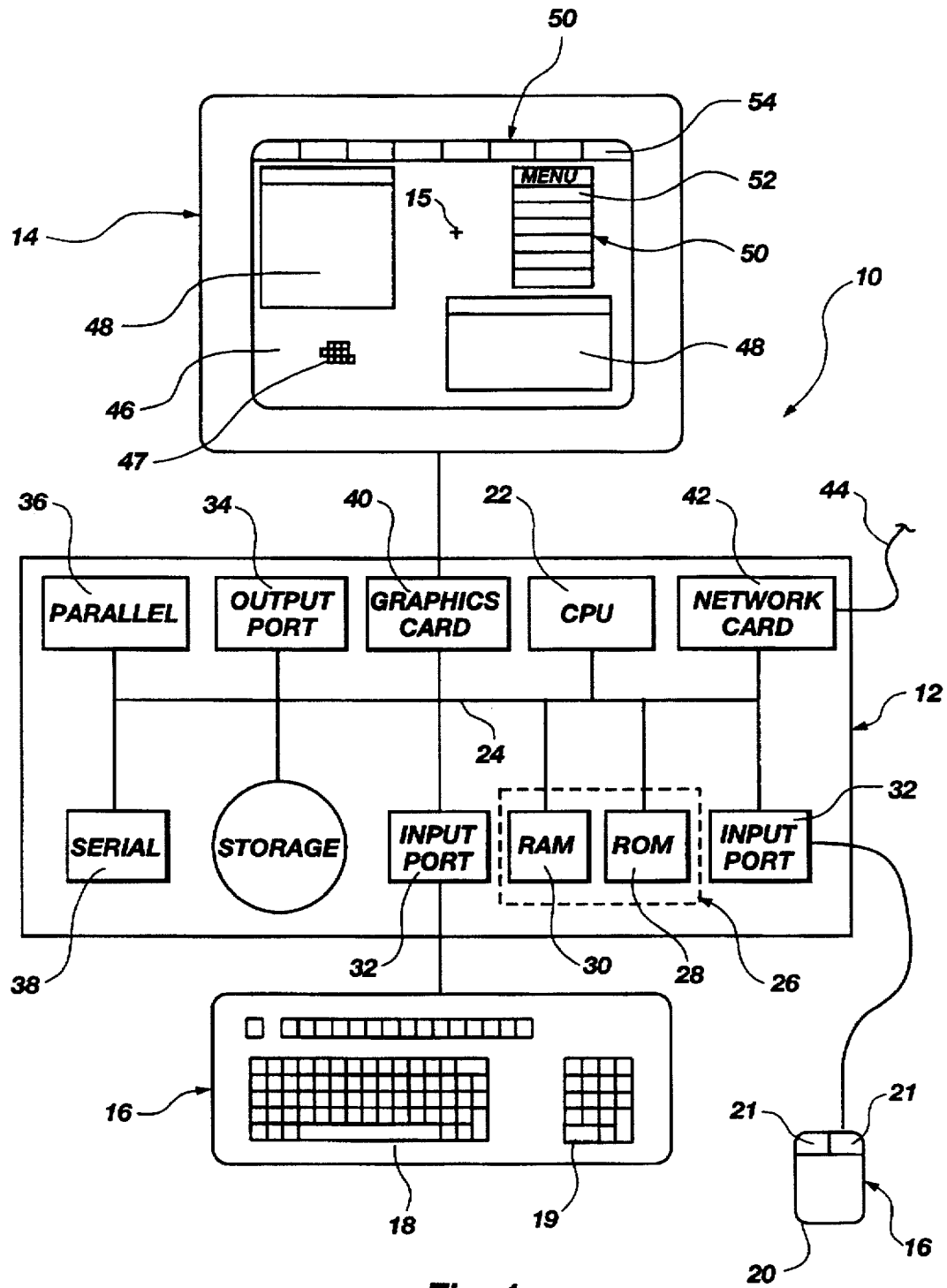
FIG. 1 is a schematic block diagram of one presently preferred embodiment of an apparatus made in accordance with the invention.

FIG. 1 is a schematic block diagram of one presently preferred embodiment of the hardware components that may be included in an apparatus made in accordance with the invention. Also included is one connection scheme for linking hardware components relied upon.

Figure 2:
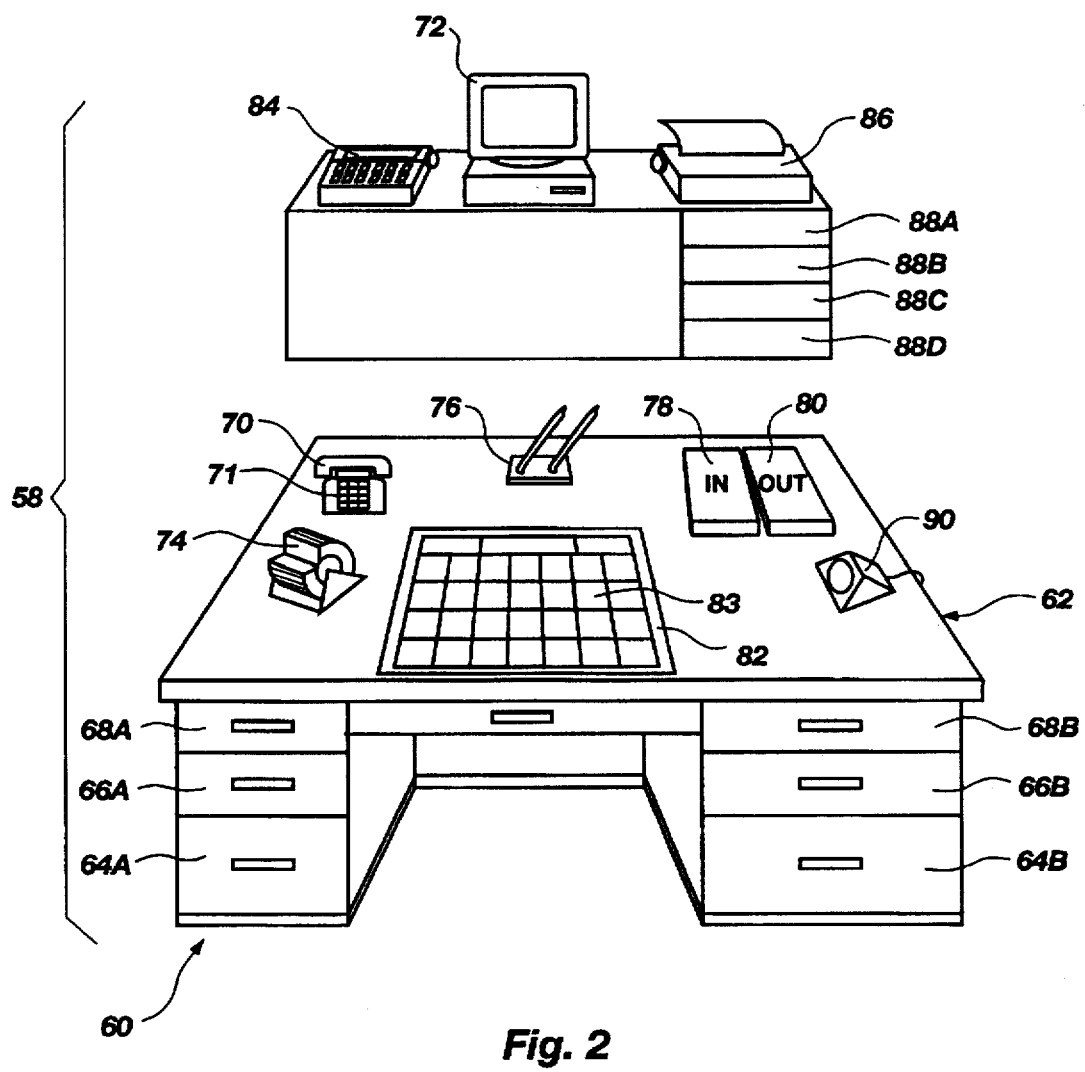
FIG. 2 is an image that may be displayed on the display of the apparatus of FIG. 1.
Figure 5:
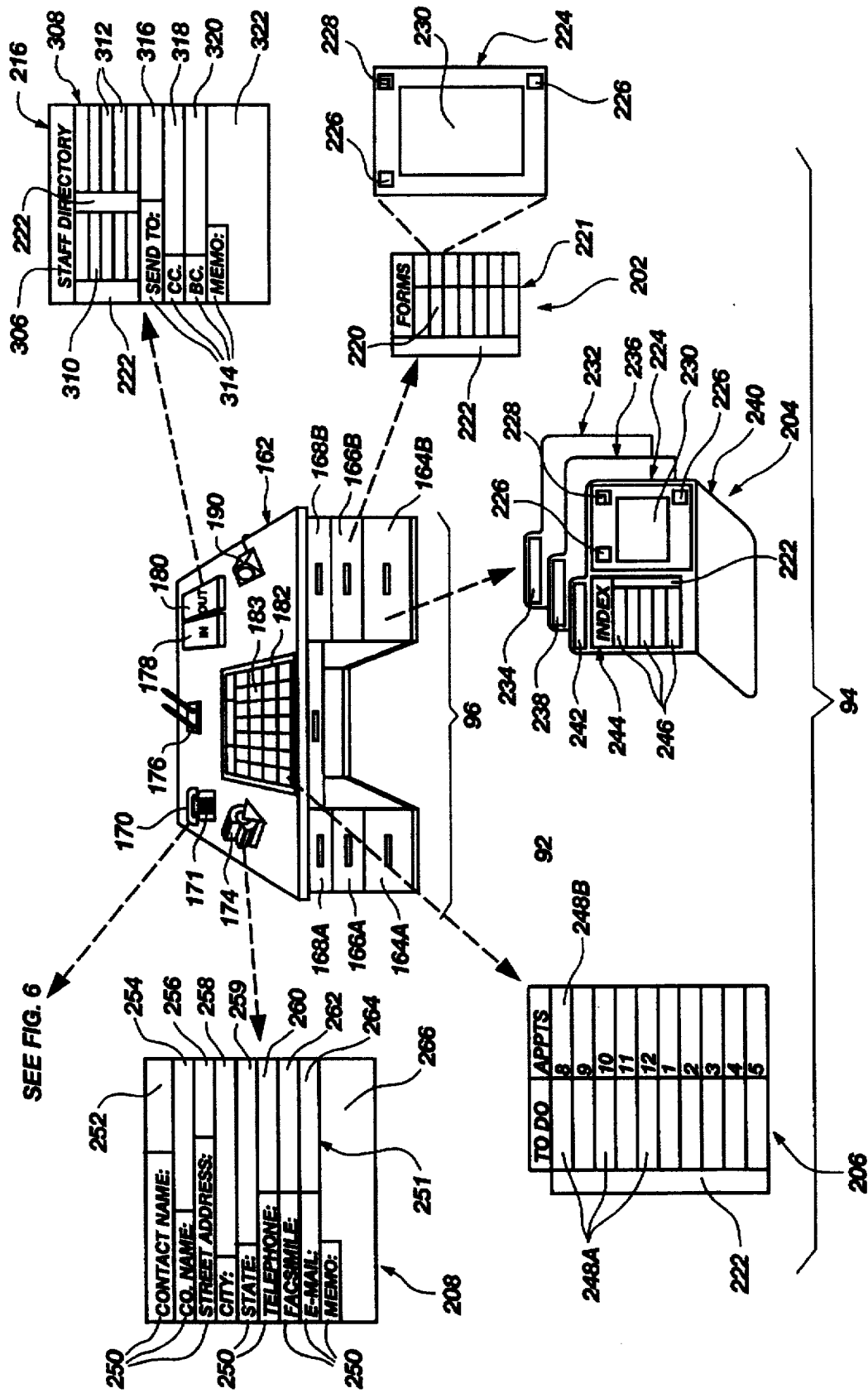
FIGS. 5 and 6 are schematic block diagrams of selected graphical objects representing functional objects that may be associated with hot spot objects included in the template of FIG. 3.
Figure 6:
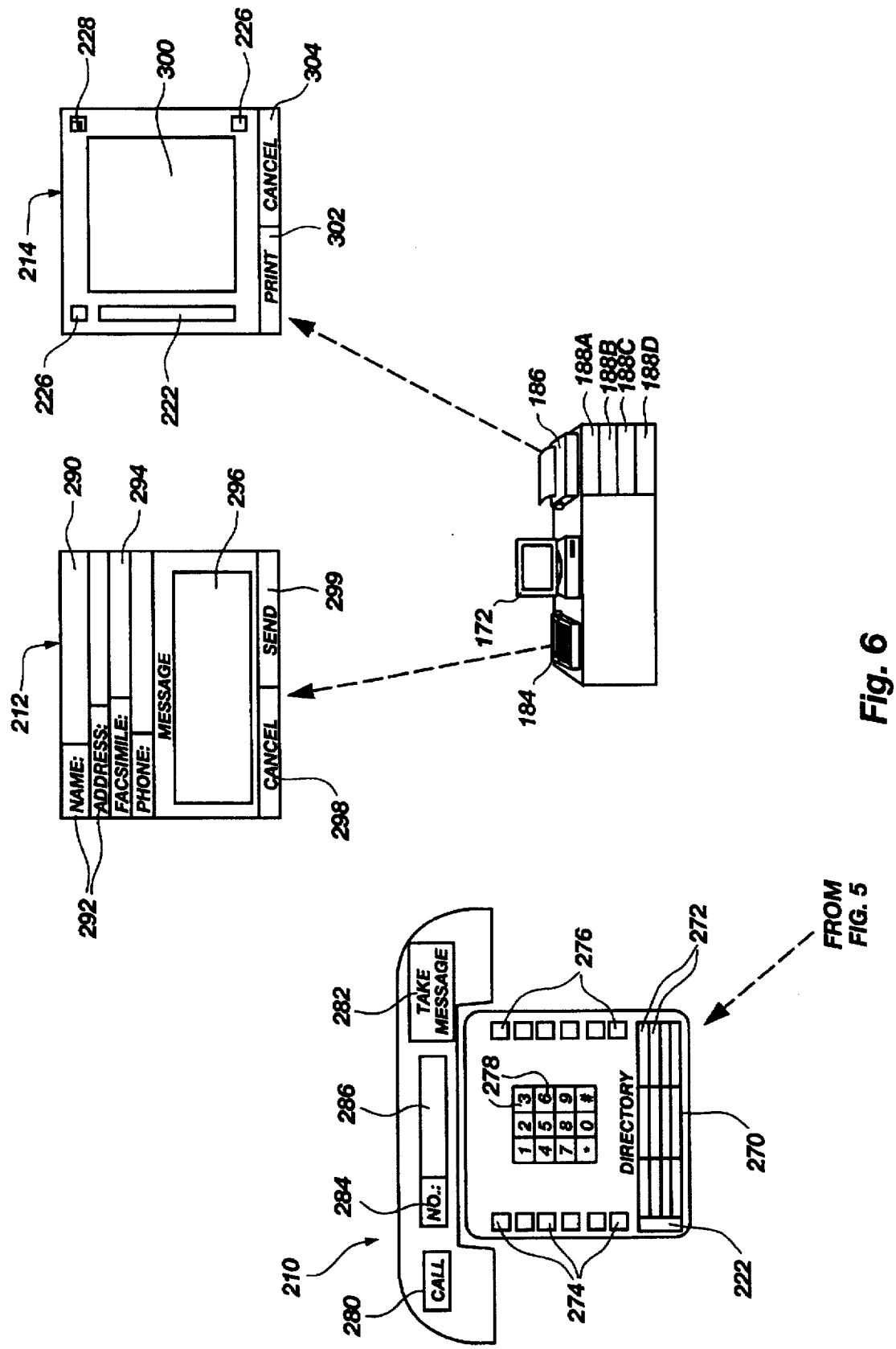

Beginning with FIG. 2, an image is illustrated, still somewhat schematically. The image may be displayed on the display of the apparatus of FIG. 1. Mapped to the image may be the template illustrated in FIG. 3, in which each object of the template may correspond by a suitable link to some portion of the image of FIG. 2. Skipping to FIG. 5, FIGS. 5 and 6 are schematic block diagrams of selected graphical objects and functional objects that may be associated with hot spot objects included in the template of FIG. 3.

Figure 4:
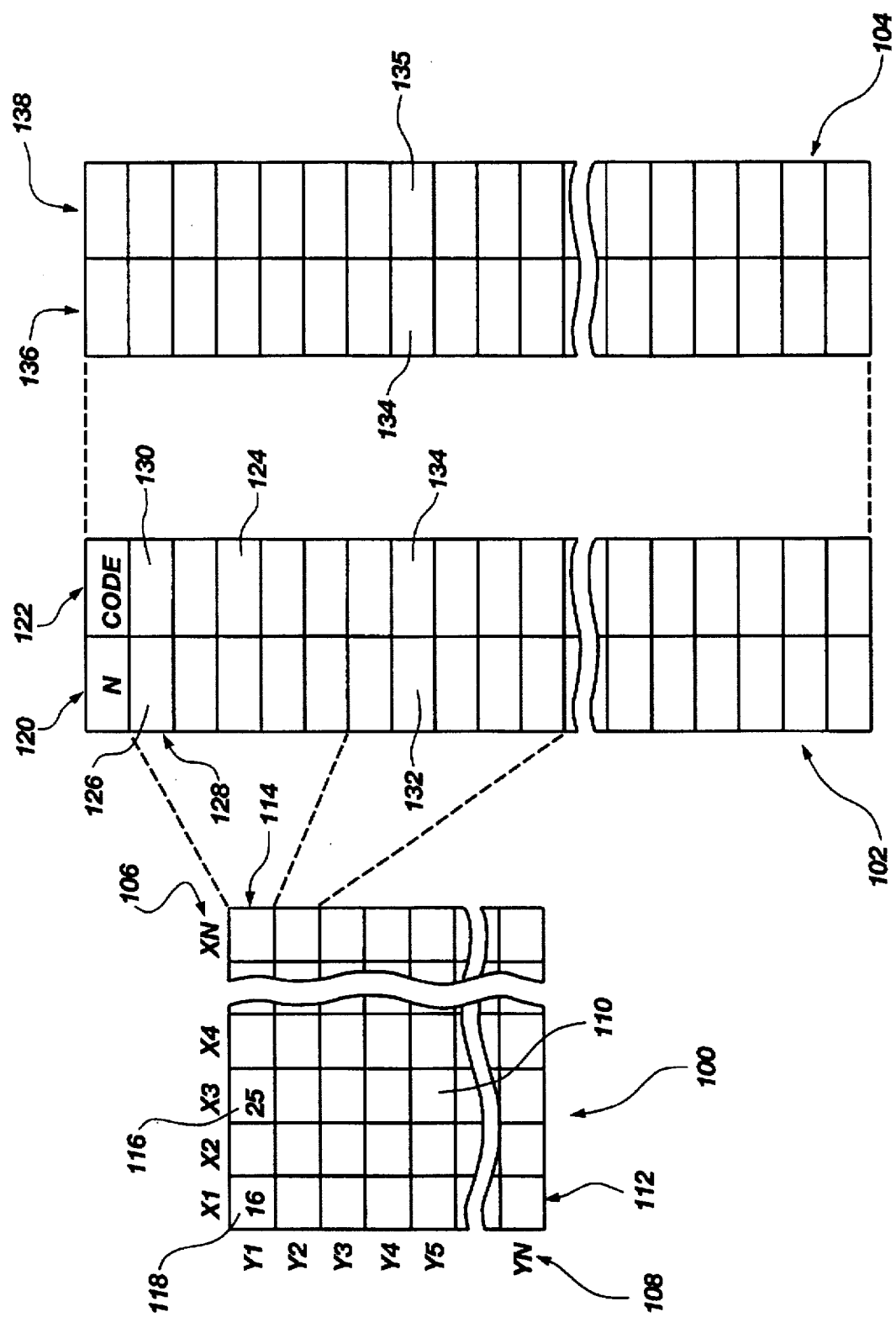
FIG. 4 is a schematic block diagram of mappings of pixels located in hot spots of the template of FIG. 2 to corresponding color codes and functional objects.
Figure 7:
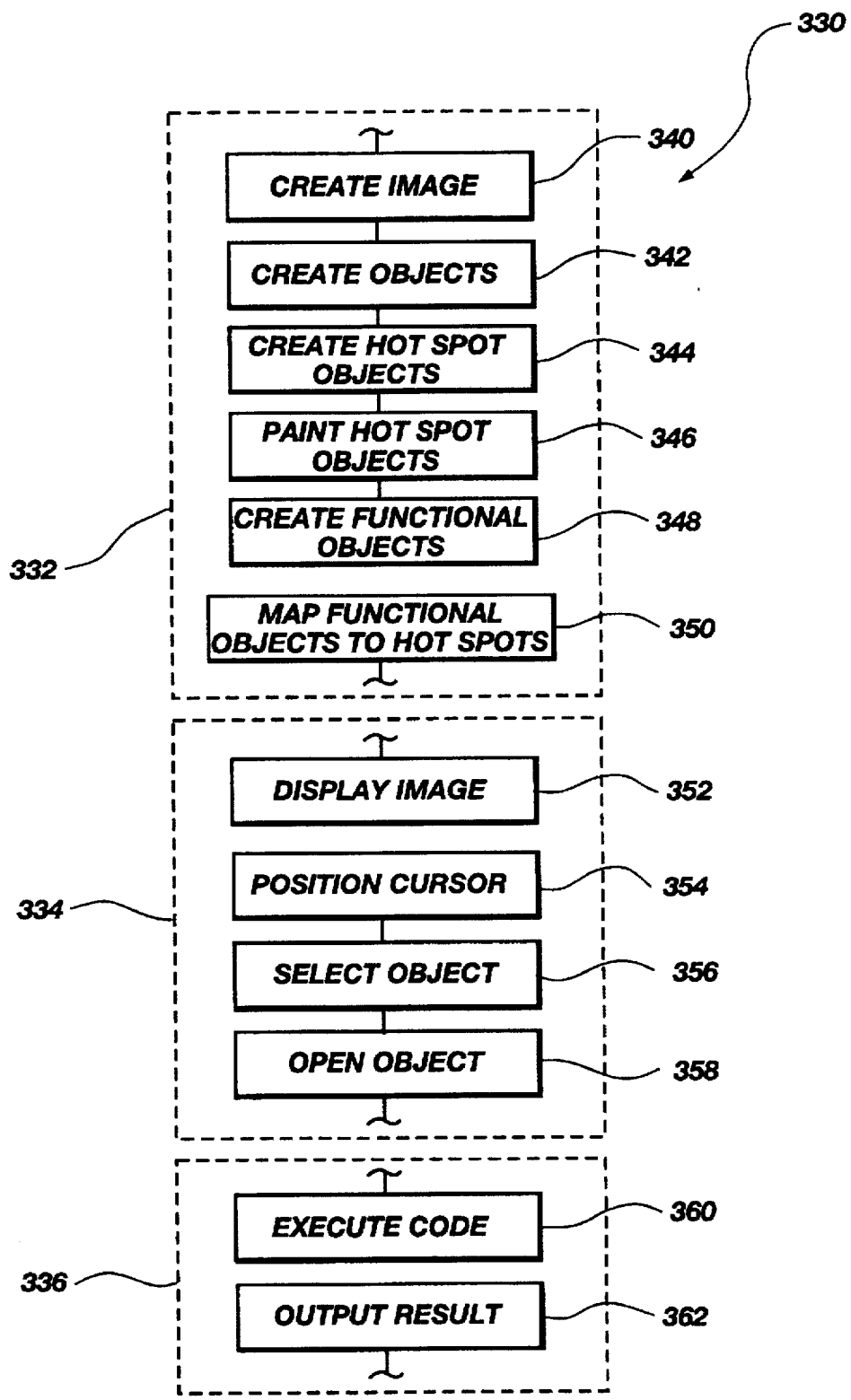
FIG. 7 is a schematic block diagram of the processes by which color maps may be made for linking pixels to functional objects at a resolution of a single pixel.

Reference is next made to FIGS. 4 and 7, which illustrate one preferred embodiment of a schematic diagram of data structures, such as mappings or indices, and processes that may be implemented on the apparatus corresponding to the block diagram of FIG. 1. FIG. 4 is a schematic block diagram of mappings of pixels located in hot spots of the template of FIG. 2 to corresponding color codes and functional objects. FIG. 7 is a schematic block diagram of the processes by which color maps may be created for linking pixels to objects and functional objects at a resolution of a single pixel, and by which such color maps may be used to launch executable codes, such as functional calls, applications, features of applications, and the like.

Those of ordinary skill in the art will, of course, appreciate that various modifications to the schematic diagrams of FIGS. 1-7 may easily be made without departing from the essential characteristics of the invention, as described in connection with the block diagram of FIGS. 1, 4, and 7 above. Thus, the following descriptions of the detailed schematic diagrams of FIGS. 1-7 are intended only as examples, and Simply illustrate certain presently preferred embodiments consistent with the foregoing description of FIGS. 1-7 and the invention as claimed herein. Referring to FIG. 1, an apparatus 10 made in accordance with the invention, may include a computer 12, operably connected to a display device 14 such as a monitor 14, flat panel display 14, cathode ray tube (CRT) 14, or the like. The computer 12 may also include an input device 16 such as a keyboard 18 having a keypad 19 or a mouse 20 having buttons 21. Alternatively, the computer 12 may be considered to include the display device 14, input devices 16, and other peripheral equipment required for operation.

The apparatus 10 may be configured with appropriate software modules for functioning as a colormap system 10 for accessing applications, executables, files, or functions that might be hosted on a computer 12 or controllable by a computer 12.

In FIG. 1, the computer 12 may include a processor 22 or central processing unit (CPU) 22. The CPU 22 may connect by a bus 24 to a memory device 26. The memory device 26, may include a read-only memory device (ROM) 28, a random access memory device (RAM) 30, or may include both, for storing data such as mapping indices. The memory device 26 may be used for storing "executables" (coded, executable instructions), data, objects, mappings, indices, and other data structures necessary for operating the apparatus 10.

The processor 22 may include one or more of the popular computer processors such as the 80286, 80386, 80486, and pentium processors produced by Intel™, or the 68030, 68040, or the like produced by Motorola™. Other processors may also be adaptable for use in the apparatus 10.

The operating system hosted on the processor 22 may be a single-tasking operating system such as the Disk Operating System (DOS), Windows, or the like. The operating system may be a multi-tasking environment, such as UNIX, Windows95™, the Macintosh™ Operating System, Next Step™, or the like. A multi-tasking operating system may have certain advantages in maintaining simultaneous operation of multiple processes associated with the apparatus 10. The bus 24 may be configured in any suitable topology to connect the processor 22 to the other devices 26, 28, 30, 32, 34, 36, 38, 40, 42.

The computer 12 may include input ports 32 for connecting the keyboard 18 and mouse 20 to the bus 24. Other input ports 32 may be provided, as well as output ports 34 for connecting to various output devices in addition to the display 14. Nevertheless, the display 14, may include touch screen types of displays, thus becoming both an input device and an output device.

The graphics card 40 may be connected to the bus 24 for communicating between the processor 22 and the display 14. In one embodiment of an apparatus 10 made in accordance with the invention, the graphics card 40 may support bit-mapped graphics. A bit-mapped graphical image in such an embodiment may be accessed by individual pixel made active or rendered "hot spots" for designation and selection of applications and features by a user.

Parallel and serial ports 36, 38, respectively, may be provided for connecting other peripheral devices to the computer 12 as needed. Also, the computer 12 may be configured with a network card 42 for connecting to a network 44. The network 44 may include a local area network (LAN), a wide area network (WAN), or an internetwork including other networks and routers.

Referring to FIG. 1, the display 14 may include a screen 46 such as a cathode ray tube (CRT), phosphorescent screen, a liquid crystal display (LCD), a flat panel display, or other types of displays for presenting images to a user.

The screen 46 may be provided with data from the CPU 22 through the graphics card 40 for presenting one or more windows 48, sometimes also called screens 48, for presenting information. Each window 48 may be thought of as a smaller individual screen 46 associated with a particular application, or a feature within an application running on the CPU 22.

Within the windows 48, or elsewhere on the screen 46, the graphics card 40 may facilitate display of menus 50 including entries 52 disposed vertically, entries 54 disposed horizontally, some mixture of both, or an icon-based selection palette.

Referring now to FIG. 2, the screen 46 may have presented thereon an image 60. The image 60 may be created by the CPU 22 based upon information processed by the CPU 22, created by applications running on the CPU 22, or from information in a ROM 28 simply rendered via the graphics card 40 on the screen 46. The image 60 may be presented on the screen 46, occupying the entire screen, or in one of the windows 48 created for that purpose by software applications operating on the CPU 22.

In the example of FIG. 2, the image 60 may represent an office. The office may include a desk, having various file drawers 64a, 64b, form-type drawers 66a, 66b, or other drawers 68a, 68b for storing other types of information and utilities.

The image 60 may actually be produced from a photograph, or may be created by a user from a drawing, or may be created from a series of graphical objects 58. In addition, "drag-and-drop" objects may be provided in a pre-programmed format to include various graphical objects 58, each having predetermined characteristics, user-settable characteristics, or a combination, for ready assembly and inclusion by a user. Thus, the image 60 of FIG. 2 may be created in numerous ways to present to a user a scene reflecting an actual scene at a specific location, or a hypothetical scene having meaning to a user.

The image 60 may include, for example, smaller images, portions, or graphical objects 58 representing a telephone 70, a computer 72, or an index 74 of clients, accounts, contacts, or the like, such as might be stored on a roller index in hard copy.

An object 58 or icon 58 representing writing tools 76, an in-box 78 representing incoming messages, mail, e-mail, or the like, along with a corresponding out-box 80, may also be represented in the image 60. Similarly, a calendar 82 having individual data blocks 83 may also be provided. Thus, the calendar 82 may be an individual object, while each date block 83 may also be an individual object.

The image 60 need not be comprised of objects 58. Nevertheless, in one presently preferred embodiment of an apparatus 10 made in accordance with the invention, the image 60 may be comprised of objects 58. Nevertheless, the graphical objects 58, if not inherent in the image 60, may be created later by a user to correspond to a silhouette or projected area of each item 62–90 in the image 60.

Any equipment, location, tools, materiel, spaces, or the like may be presented in the image 60 for presentation to and designation by a user. Thus, a facsimile machine 84, a printer 86 for a computer, typewriters, instruments, meters, and the like (not shown), paper shelves 88a, 88b, 88c, 88d for different types, grades, colors, or other selections of paper, and an intercom 90 may all be illustrated in the image 60.

Figure 3:
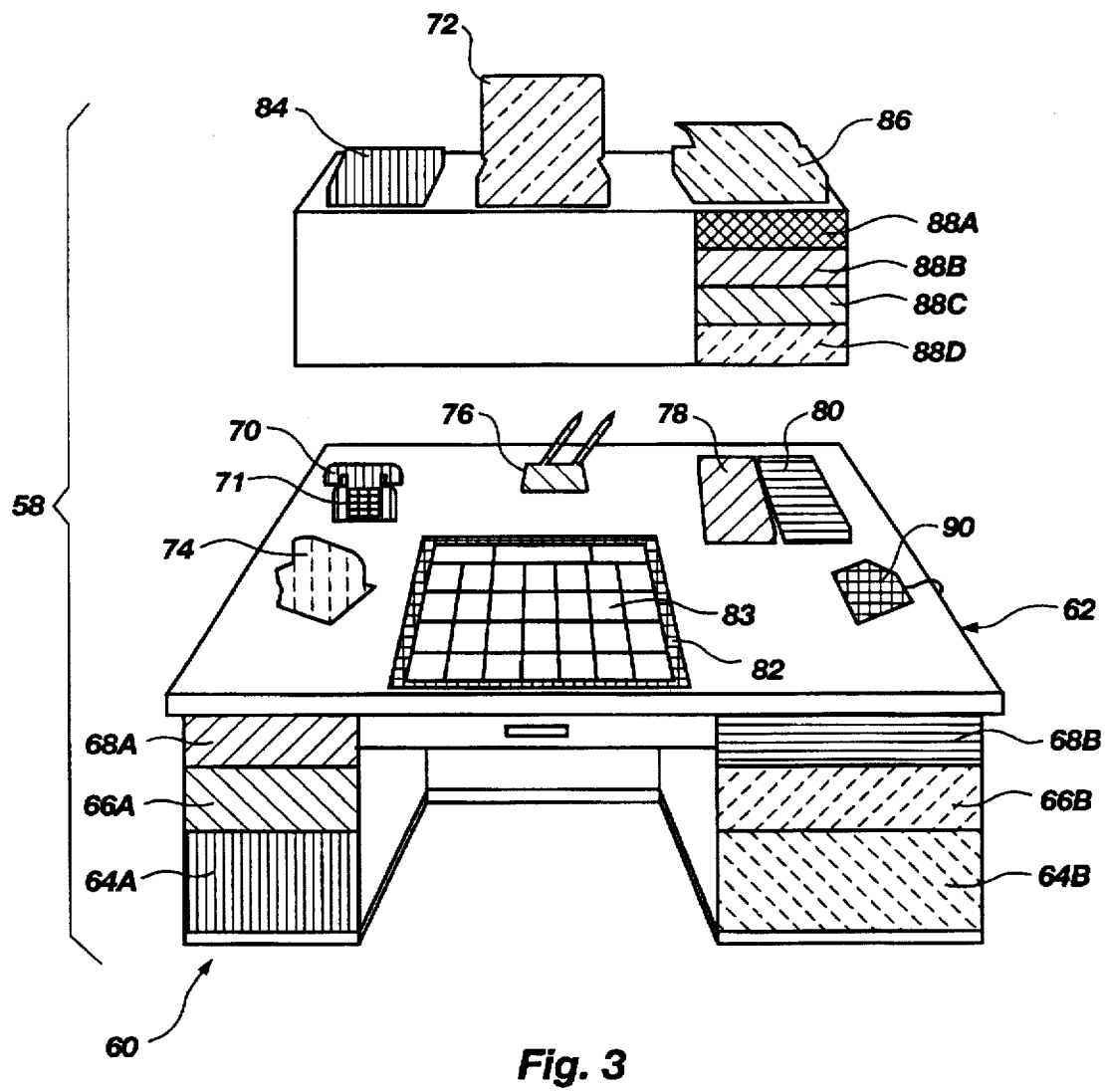
FIG. 3 is a schematic diagram of a template corresponding to the image of FIG. 2.

Referring now to FIGS. 2 and 3, a user may prepare a template 92 of graphical objects 58. The cross hatching indicates objects that may be hot spot objects 96, and thus part of the template 92. Other lines are for clarity, but any portion of the image 60 may have an associated hot spot object 96. If the graphical objects 58 are not inherent in the image 60, then a user may create graphical objects 58. In an apparatus 10 made in accordance with the invention, each graphical object 58 may be defined within a resolution limit within one pixel or picture element of the display 14.

The template 92 may include hot spot objects 96 corresponding to a graphical object 58 corresponding to portions of the image 60. A user may create a hot spot object 96 by preparing a graphical object 58 having a shape corresponding to a silhouette of any portion of the image 60 desired by the user to be made interactive for a user.

Each hot spot may be created as a graphical object 58 within the meaning of graphical objects within the programming arts for object-oriented programming. Opening each hot spot object 96 by a user may then be made to correspond to some function, call, feature, application, executable instruction, or other response in the processor 22 desired by a user to be activeated upon designation or opening of the hot spot object 96.

The hot spot objects 96 may be selected by a user. For example, a user may move the mouse 20 to a position corresponding to locating a cursor 15 within a hot spot object 96. The user may then click a button 21 of the mouse 20 one or more.

Upon opening an objected associated with a hot spot object 96, a user may be presented with a corresponding expansion object 94 from among a plurality of expansion objects 94 provided. Hot spot objects may include, for example, the hot spot objects 162–190, while the expansion objects 94 may include the expansion Objects 202–216.

Expansion objects 94 may be cascaded. That is, selection, such as by clicking on a mouse button 21 may select a hot spot object 96. Meanwhile, some actions, such as a double click of a button 21 when a hot spot 96 is designated by the cursor 15 positioned therein, may open a hot spot 96, presenting an expansion object 94. Double clicking the button 21 on an expansion object 94 may present another expansion object 94 illustrating an additional level of detail, as illustrated in FIG. 5.

Graphical objects 58 such as icons, boxes, buttons, and the like used by programmers in object-oriented applications and environments, are typically limited to very rudimentary shapes. Rudimentary shapes are required, since determination of the bounds of a hot spot object 96 or whether location of a cursor 15 is within the hot spot object 96 requires substantial processing by a CPU 22.

In order to provide high speed, real-time tracking of a cursor 15 to determine the existence of the cursor 15 within a hot spot 96 and thus to provide rapid selection or opening of an expansion object 94 upon clicking on a hot spot 96, a reduction in the processing required by the CPU 22 is required. Unfortunately, each developer of each application may create data structures of a completely different format from those of another developer of another application. In short, no commonality appears readily available for searcing bounds of designated objects 58, hot spots 96, and expansion objects 94 in a rapidly linking format.

Thus, a universally applicable method of defining and accessing is needed for hot spots 96 created for any application. Moreover, a universal, high-speed, processing scheme is needed for determining whether or not a cursor 15 positioned within a screen 46 of a display 14 is within a specific hot spot 96.

Previously, with only rudimentary shapes used, processing was reduced only minimally by limiting the complexitiy, shape, ans sized of boundaries of an the underlying hot spot 96 corresponding to any graphical object 58. Likewise, users had to be very careful in positioning a cursor 15 over any icon or graphical object 58 in an image 60, to make sure that the cursor 15 was indeed within the hot spot 96, which was typically of a significantly different shape. For example, resolution, such as that required for the date blocks 83 to be selected directly from the calendar object 82 or for the individual keys 71 to be selected within the object for the telephone 70 was simply not readily available, as discussed.

In order to provide one single pixel 47 of resolution, f a bit-mapped hot spot object 96 may be any arbitrary shape. Discontinuous hot spots 96 and hot spots 96 within other hot spots 96 may thus be created on a system 10 or apparatus 10 made in accordance with the invention.

Referring to FIG. 4, the mapping of pixels 47 to hot spots may rely on linking numerical values 116, 118 corresponding to displayable colors to pixels 47 in a binding table 100. The binding table 100 may be thought of as a map stored in the memory device 26 for linking each picture element 47 or pixel 47 of interest on the screen 46 of the display 14 to a color.

Alternatively, the information of the binding table 100 may be stored in the memory device 26 as the binding table 102. That is, data corresponding to the color of each pixel in the template 92 or "color map" 92 corresponds to a unique combination of a spatial "x" coordinate 106 and a "y" coordinate 108 within the screen 46. The numerical value of the color of a pixel 47 may be presented as an entry 110 in the binding table 100 or map 100. Thus, each entry 110 corresponds to a column 112 and a row 114 in the index 100, binding table 100, or map 100 (or equivalent map 102) may be the numerical code or data word corresponding to the color of the hot spot object 96 in which the pixel 47 of interest is located. Each hot spot may correspond to a single color. Each entry 110, then, has some value such as the value 116 or the value 118 designating a color of the hot spot 96 corresponding to the pixel 47 indicated by an individual entry 110 in the map 100.

Alternatively, a map 102 or binding table 102 may be stored in the memory device 26 as a one-dimensional array having a single index column 120 to indicate all pixels. Thus, each row 114 may simply be represented by a series of entries 124 in the index column 120 of the map 102.

Similarly, a one-dimensional array may be formed as a color column 122 in which each entry 124 represents a binding between a specific value 126 of a pixel number 132 of a pixel on the screen 46 bound to a value 130 corresponding to a designation such as an index number, color code number, or the like corresponding to a hot spot 96. Accordingly, each row 128 corresponds to a single pixel 47, designated by a value 126. Meanwhile each value 130 is the representation of a corresponding color code number 134 associated with a hot spot 96 designated by the pixel 47 corresponding to the value 126.

In one presently preferred embodiment of an apparatus 10 made in accordance with the invention, each hot spot 96 is assigned a color, or the code number associated with a color. Colors are available in many applications, and any graphical object 58 may be painted with a color. Thus, hot spot objects 96 may be made as graphical objects 58 having a color. A user, or a programmer, may create hot spot objects 96 that are exact duplicates or any portion of a graphical object 58, or of any portion of an image 60. A programmer may then paint a hot spot object 96 a unique color, which color may have a distinct number or color code 134.

In general, a color code 134 or simply color 134, for short, may be a typical 8 bit number, or a 24 bit number, and in some cases, a 32 bit number. In 24 bit numbers, the code designating a color may be greater than 16 million. Thus, the number of hot spots 96 that may be mapped to an image 60 is limited only by the number of pixels 47 in the screen 46.

The number of objects 58, and their shapes, are thus only virtually unlimited for all practical purposes. The resolution for placing hot spots 96 next to one another and within one another is limited only by the resolution of a single pixel 47.

Thus, a map 102 may link a pixel number 132 with a distinct color number 134. The processor 22 may use the map 102 as a look-up table 102 or index 102 to rapidly determine the pixel number 132 corresponding to a pixel 47 on which a cursor 15 is located by a user.

Although the maps 102 and 104 may be made in a variety of ways, the effect is linkage or mapping. Whether actually located in a table 102, 104 in a memory device 26, simply coded or included in a table 102, 104 of data in pairs, or even identified by an address in a memory device 26 in which the linkage is implied, a mapping may be made between a pixel number 132 and a color number 134 corresponding to the pixel number 132. Thus the maps 102, 104 simply represent the linking of pixel 47 to a color 134 and an instruction 135 in the memory device 26. A virtual index may be created by placing values in registers of the memory device 26 according to a scheme understood by the processor.

Similarly, each color number 134 may be mapped to a definition 135 by a map 104. That is, a map 104 may contain a list 136 of colors 134 linked to a list 138 of definitions 135.

Each definition 135 may correspond to a function, a call, and executable instruction or code, a location within an executable program, or the like, indicating what step is to be executed by the processor 22 in response to a selection or opening of a hot spot object 96 designated by a cursor 15. Thus, a combination of mapping a pixel number 132 to a color number 134 corresponding to a hot spot 96 for which the color number 134 is a distinct and unique identifier, may map every pixel 47 to a distinct color.

Expanses within an image 60 that are intended to designate nothing, may be designated with a single particular color, such as black, for example. In turn, the map 104 may uniquely designate a definition 135 corresponding to each color 134.

Thus, rather than complex processing of data defining a shape of a simple graphical object 58, such as a geometric icon (polygon), to determine whether or not the cursor 15 is within a hot spot object 96, the processor 22 may execute a quick look-up procedure within the map 102 and the map 104. Thus, any pixel number 132 may be linked to a functional definition 135 extremely rapidly, even in real time.

Referring now to the example of FIGS. 2, 3, 5, and 6, each of the graphical objects 58 created to correspond to a portion of the image 60, may be or have a corresponding hot spot object 96. For example, in a desk hot spot 162, the drawer hot spots 164a, 164b, 166a, 166b, 168a, 168b may represent the corresponding desk 62 and drawers 64A, 64B, 66A, 66B, 68A, 68B.

A telephone hot spot 170 may correspond to the telephone 70, while the computer hot spot 172 may correspond to the image of the computer 72. Similarly, the index hot spot 174, writing tools hot spot 176, in-box hot spot 178, out-box hot spot 180, calendar hot spot 182, facsimile hot spot 184, and printer hot spot 186 may correspond, respectively, to the images of the index 74, writing tools 76, in-box 78, out-box 80, calendar 82, facsimile 84, and printer 86.

Likewise, the key hot spot 171 and the date hot spot 183 may correspond to the images of the keys 71 and date blocks 83 of the telephone 70 and calendar 82, respectively. A printer hot spot 186 corresponding to the image of the printer 86, a paper hot spot 188a, 188b, 188c, 188d corresponding to the images of the paper shelves 88a, 88b, 88c, 88d, and an intercom hot spot 190 corresponding to the image of the intercom 90 may also be included.

In each case, a hot spot object 96 corresponds to a portion of an image 60 that may be represented by a graphical object 58. If an image 60 is comprised of graphical objects 58, then hot spot objects 96 may be simple copies of graphical objects 58 painted according to a designated color code 134. Alternatively, the hot spot objects 96 may be the only graphical objects 58 created, and simply correspond to silhouettes of arbitrary, selected portions of the image 60.

Thus, portions of the image 60 may be graphical objects 58, but need not be.

Upon opening a hot spot object 96, a user may be presented with an expansion object 94. An expansion object 94 may be opened to present other expansion objects such as documents, indices, applications, and the like. For example, in one presently preferred embodiment of an apparatus 10 made in accordance with the invention, opening a drawer hot spot object 166b (or drawer object 166B, for short) may present a forms object 202 that may be opened in turn to present a document object 224. Similarly, opening a drawer object 164b, a date object 183, an index object 174, a telephone object 170, a facsimile object 184, a printer object 186, or an out-box object 180 (all of which are hot spot objects 96) may result in the presentation, respectively, of the corresponding files object 204, calendar object 206, index object 208, telephone object 210, facsimile object 212, printer object 214, and out-box object 216.

The objects 202–216 may represent executable functional objects 135, whereas the objects 162–190 may be thought of as hot spot objects 96. It may be proper to speak of the underlying executable or its corresponding hot spot object 96. Each hot spot object 96 may be programmed to open another "functional object" 135 or instruction 135 For example, the computer hot spot object 172 may be opened to power on a computer, launch programs, and otherwise manage operation of an actual computer for a user as part of a graphical user interface.

Each of the functional objects 202–216 may include hot spots 96 for other individual objects within any portion of an image corresponding to a functional object 135. Thus, the forms object 202 may include several entries 220 in an index 221 accessible by designating of a position of the cursor 15 along a scroll bar 222, all of which may be active hot spot objects 96.

Similarly, the designation of a particular entry 220 may open a document object 224 containing control icons 226 for performing various tasks of control such as opening, closing, paging forward, paging backward, and the like. An enlargement icon 228 may allow a document object 224 to fill the entire screen 46 of the display 14, thus becoming a word processor, in effect. Similarly, a document window 230 may be an object presented in the document object 224. The control icons 226 may be placed conveniently surrounding the document window 230 containing text or figures to be edited by a user.

A file object 204 may be programmed to include folder icons 232, 236, 240 each containing within its closed perimeter a label icon 234, 238, 242, respectively. Opening a folder icon 240 may present a document window 230 such as is described above. The label icons 234, 238, 242 may be designated by the cursor 15 separately from the folder icons 232, 236, 240.

Similarly, a generalized index 244 may be presented containing numerous entries 246, each of which may have associated with it a hot spot 96 the opening of which may present a document window 230 or other functional object. Similarly, a scroll bar 222 may provide a user the ability to browse the index 244 designating and launching entries 246 at will.

A hot spot object 96 may be associated with the calendar object 182 or an individual date object 183. For example, a date object 183 may be opened to present an agenda object 206 having various entries 248A and 248B corresponding, respectively, to tasks, and appointments.

An index hot spot 174 may be opened to present an index object 208. The index object 208 may include prompts 250 along with various fields 251 such as a name field 252, company field 254, street field 256, city field, 258, state field 260, fax number field 262, electronic mail address field 264, memo field 266, or the like.

A user may select a field 251 (which may be a field hot spot object 251) and enter corresponding data. Alternatively, a user may drag, such as by using a cursor 15 and input device 16, for example, a first object on the screen 46 from a location to drop the first object on a second object, thus incorporating within the second object the information contained within the first object.

For example, a user may drag the index object 208 to the phone object 210, thus automatically inputting into a telephone call on a real telephone, all of the information in the index object 208 that is needed by the telephone object 210 in order to execute a telephone call. Similarly, the telephone object 210 may include an index 270 or index object 270 containing various entries 272.

As with a real telephone in an office, a user may use button objects 274 to indicate a designation of a phone line to be used, or buttons 276 to designate the internal telephone number of a staff member within the individual office. Likewise, the number buttons 278 may be opened by a user after being designated with the cursor 15 a number to be presented in a display 286 in response to a prompt 284. Thus, a user may designate a telephone number individually, or may use the scroll bar 222 to select an entry 272 from the index 270, which entry 272 may then be dragged and dropped on the display 286 to be automatically entered. Similarly, opening a call button 280 may initiate a call to a number in the display 286, while another functional feature of a telephone may be invoked by another button 282, such as a take message button 282.

In short, a combination of designation of a hot spot object 96, followed by an appropriate input by a user may open a functional object and thus launch an executable instruction or an application. Similarly, various objects within the objects hot spots 96 may be dragged and dropped to combine information readily, eliminating the need for a user to key punch data. A user may merely designate a proper index, data base, or other data structure, by selecting a proper hot spot 96 corresponding to such data structure, and then drag and drop the corresponding object 96 in the proper location. Thereafter, a user may launch the application whose hot spot 96 is at the new location to use the information previously dragged and dropped.

Other objects such as a facsimile object 212 may also be created and used. For example, the facsimile object 212 may include fields 290 or entries 290 that may be filled in response to prompts 292. For example, a fax number object 294 may be provided by dragging and dropping information from the index object 208. Similarly, the message object 296 may be filled by dragging and dropping a document object 224 from the forms object 202 or the files object 204. Similarly, operations such as canceling and sending faxes may be designated by a cancel button 298, send button 299, or the like.

In similar form, a printer object 214 may be presented by opening a printer object 186. A document field 300 may be filled by dragging and dropping any document object 224, and an operational button, such as a print button 302 or cancel button 304 may be provided.

Opening an out-box object 180 to present an out-box object 216 may provide an alphabetical index 306, or other object. For example, the alphabetical index 306 may be the same index as that opened by accessing the index object 174.

Alternatively, the alphabetical index object 306 may be separately maintained. Similarly, an organizational index 308 may be presented for locating individuals by organization, rather than by alphabetical name.

Similarly, an the organizational index object 308 may simply represent an arrangement of the same information corresponding to an index object 306 or index object 208, sorted according to a different entry 310, 312, respectively. For operation, prompts 314 may direct a user's attention to a destination field 316 that may be a destination object 316, a copy object indicating individuals who should receive copies, a blind copy object 320 indicating individuals to receive blind copies of the included memorandum 322. As with other objects, the out-box object 216 may be filled in by information dragged between objects. For example, a document object 224 from the forms object 202 or the file object 204 may be dragged to the memo object 322 for automatic inclusion in a message to be sent out.

Thus, in general, by creating color maps as indices 102, 104 or templates 92 corresponding to pixel numbers 132, the processor 22 may rapidly designate the color code 134 of an individual pixel 47 in the template 92 of FIGS. 3 and 5. Similarly, the processor 22 may rapidly determine from the maps 102,104 the corresponding definition 135 associated with any individual color 134 corresponding to a hot spot object 96 in which a pixel number 132 is located.

Referring to FIG. 7, in an apparatus 10 made in accordance with the invention, an executable 330 may include a mapping process 332, an accessing process 334, and an execution process 336. The processes 332, 334, 336 may be found in the same section of the executable 330, or may be separately coded to be called or otherwise executed at an appropriate time. Software modules within the executable 330 may be configured in a variety of ways, including existence in separate applications. Thus, a ROM 28 may be sufficient for a memory device 26, if a user is not creating, but simply using hot spot objects 96 created by an application.

In the mapping process 332, the processor 22, or a user, by suitable inputs to the processor 22, may create 340 an image, such as the actual image 60. A user or programmer then may create 342 objects. The objects may correspond to graphical objects 58 or hot spot objects 96.

The create 342 process may use objects created during the create 340 process. That is, for example, an image 60 created during the create 340 process may be made of graphical objects 58. Thus, the graphical objects 58 may be simply designated as the objects during the create process 342. The create 344 process for creating hot spot objects may scale hot spots to create a smaller version of the image 60.

The create 344 process may occur directly after the create 340 process, dispensing with an immediate create 342 process. Each hot spot object 96 may simply correspond to a region of an image 60, and may not have a distinct object to which it corresponds. Nevertheless, the create 342 process may be thought of as creating an object. creating 344 a hot spot object 96 may also be thought of as designating an object so created to be a hot spot 96. Thus, in general, both the processes 342, 344 may be used, followed by painting 346 each hot spot with a unique color designation 134.

The create 348 process for creating functional objects, may be executed by a user creating distinct objects. Alternatively, a user may simply assign pre-programmed definitions 135 to graphical objects 58. Thus, in one embodiment of an apparatus 10 made in accordance with the invention, a user may import an image in the create 340 process, create 342 objects by tracing around portions of an image 60 imported during the create 340 process, and designate or create 344 hot spot objects 96 by simply selecting certain of the graphical objects 58 to be hot spots 96. Then, a user may assign or paint 346 a unique color to each object 96 created in the create 344 process and select from a menu of potential functions (definitions 135) such as telephone calling, facsimile sending, document creation, indexing, and the like, a functional object 135 to be associated with each hot spot object 96.

Alternatively, the create 348 process may be accomplished by coding instructions to be associated with a hot spot object 96. Thus, the entire processes 340, 342, 344, 346, 348 may be done by a series of drag-and-drop type configuration selections by a user of very limited skills.

Alternatively, the processes 340–348 may be executed by an individual programmer writing executable code at every step. The creation 348 process corresponds to developing a definition 135 to be executed upon selection of a hot spot object 96 associated with a color code 134.

A user may next map 350 the functional objects 135 to the hot spot objects 96. In one preferred embodiment of an apparatus 10 made in accordance with the invention, a user may assign an individual color 134, or color code 134, corresponding to a color, to a hot spot object 96. Thus, creation of the map 104 may link the color 134 of an individual hot spot object 96 to its corresponding definition 135 to complete the process 350. A color 134 may be a gray scale or a true color from a combination of red, blue, and green. However, by displayable color 134 is not meant that the display 14 must be able to display the actual color, but that the processor 22 must be able to process the color number 134, and the memory device 26 to store it.

Correspondingly, the create 344 and paint 346 processes may be thought of as corresponding to creation of the map 100 or map 102. That is, creating a graphical object 58 or a hot spot object 96 on a screen 46 may be thought of as creating certain of the entries 110 of the map 100 or binding table 100.

Painting 346 may be thought of as filling in or assigning colors to pixels 47 within a boundary of a hot spot object 96. By painting 346 an object, a user has created a binding table 102 linking each pixel number in the screen 46 with its corresponding color number 134.

By creating 348 a functional object, a user has created the definition 135. By assigning a color number 134 to the definition 135, a user may create a map 104. With the maps 102, 104 in a memory device 26, a user may use a color map 92, 102, 104 to access functional objects 135 quickly and precisely within a single pixel of resolution.

The accessing process 334 may be executed at any time after the mapping process 332 has been completed. A user may launch an application or otherwise display 352 an image 60 on a screen 46.

A user may next position 354 a cursor 15 on the image 60 displayed. A user may next select 356 a hot spot object 96 that may or may not be the color illustrated in the image 60. That is, a hot spot 96 underlies the image 60, and has associated with it certain pixel numbers 132 corresponding to pixels 47. The colors displayed in an image 60 need not bear any relationship to the color code 134 designated in the color maps 102, 104.

A user may select 356 by any conventional means such as by clicking a button 21 of the mouse 20. A user may similarly open 358 an object associated with a hot spot object 96 by double-clicking the button 21.

Upon opening 358, in the accessing process 334, the executable 330 by a user, the processor 22 may at some subsequent time execute 360 a portion of code associated with the definition 135 corresponding to the color code 134 during the select 356 and open 358 processes. The execution process 336 may then output 362 a result to a user. For example, the output 362 process may result in the presentation of one of the expansion objects 94 associated with the hot spot object 96 selected 356.

From the above discussion, it will be appreciated that the present invention provides a color map as an indexing and searching method. The color map system provides a system of hardware that may present to a user an image, and facilitate designation of any portion of the image, in virtually any geometry, as a hot spot for launching functional objects.

The resolution available for an object may be a single pixel. Two adjacent pixels may be in different objects, with no intervening buffer space required. A single pixel may be a single hot spot. Thus the color map system 10 may greatly multiply the number of hot spots 96 that may be used to correspond to an image 60 or portions thereof. That number may only be limited by the number of pixels 47 available in a display 14 and the largest number that may be counted by the available color bit designation 134 (e.g. 8-bit, 24-bit, 32-bit, etc.).

The color map system 10 also serves to create a linking structure 102, 104 to associate, store, and search information much more rapidly than heretofore possible. Regular polygons are not required for hot spots 96 to be rapidly discernible by a processor 22. Moreover, a hot spot 96 associated with any portion of a displayed image 60 may be convoluted, hidden, discontinous, and even chimerical without effectively slowing the processor 22 in rapidly identifying any designated object upon selection by a user.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An apparatus for providing to a user interaction with a processor, the apparatus comprising:

a display device comprising a plurality of pixels for displaying to a user and a cursor positionable with respect to the plurality of pixels, the display device being operably connected to the processor to exchange data therewith;

an input device operably connected to the display device to be actuable by a user for positioning the cursor and for providing an actuation signal detectable by the processor; and a memory device operably connected to the processor for storing a first index linking a first pixel of the plurality of pixels to a first color number corresponding to a first color displayable by the display device, and for storing a second index linking the first color number to a first instruction stored in the memory device and executable by the processor.

2. The apparatus of claim 1 wherein the processor is programmed to read the first index and second index in the memory device upon positioning of the cursor at a position corresponding to the first pixel.

3. The apparatus of claim 2 wherein the first pixel is associated with a graphical object presented to a user and associated uniquely with the first color number associated with the first pixel, and wherein the color number uniquely corresponds to the first instruction.

4. The apparatus of claim 3 wherein the processor is programmed to execute the first instruction in response to the actuation signal from the input device.

5. The apparatus of claim 4 wherein the input device includes a movable member for providing a position signal and wherein the processor is programmed to read a third index linking a position of the cursor to a first pixel number associated with the first pixel in response to the position signal received upon movement of the movable member by a user to a position corresponding to placement of the cursor at the first pixel.

6. The apparatus of claim 5 wherein the display device is configured to display a second graphical object comprising a second pixel of the plurality of pixels, the second pixel being positioned adjacent the first pixel and having a second pixel number linked in the first index to a second color distinct from the color of the first pixel, the second color being linked in the second index to a second instruction executable by the processor and distinct from the first instruction.

7. The apparatus of claim 6 wherein the display device is configured to display a third graphical object comprising a third pixel of the plurality of pixels, the third pixel being positioned adjacent the second pixel and the first pixel, the third pixel being linked in the first index to a third color distinct from the color of the first pixel and second color of the second pixel, the third color being linked in the second index to a third instruction executable by the processor and distinct from the first and second instructions.

8. The apparatus of claim 7 wherein the actuation signal is produced in response to a selection by a user communicated to the input device.

9. The apparatus of claim 1 wherein the display device is configured to display a first graphical object to include the first pixel, the graphical object corresponding uniquely to the first color number, and the first color number uniquely corresponding to the first instruction.

10. The apparatus of claim 9 wherein the display device is configured to display a second graphical object comprising a second pixel of the plurality of pixels, the second pixel being positioned adjacent the first pixel and having a second pixel number linked in the first index to a second color distinct from the color of the first pixel, the second color being linked in the second index to a second instruction executable by the processor and distinct from the first instruction.

11. The apparatus of claim 10 wherein the display device is configured to display a third graphical object comprising a third pixel of the plurality of pixels, the third pixel being positioned adjacent the second pixel and the first pixel, the third pixel being linked in the first index to a third color distinct from the first color of the first pixel and second color of the second pixel, the third color being linked in the second index to a third instruction executable by the processor and distinct from the first and second instructions.

12. The apparatus of claim 1 wherein the processor is programmed to execute the first instruction in response to the actuation signal from the input device.

13. The apparatus of claim 1 wherein the actuation signal is produced in response to a selection by a user communicated to the input device.

14. The apparatus of claim 1 wherein the input device includes a movable member for providing a position signal and wherein the processor is programmed to read a third index linking a position of the cursor to a first pixel number associated with the first pixel in response to the position signal received upon movement of the movable member by a user to a position corresponding to placement of the cursor at the first pixel.

15. A method for launching an executable instruction on a processor of a computer comprising a memory device operably connected to the processor, the method comprising:

creating an image on a display device operably connected to the processor and to an input device, the display device comprising a plurality of pixels for displaying the image and a cursor positionable with respect to the plurality of pixels by actuation of the input device by a user;

creating a graphical object on the display device corresponding to a portion of the image;

creating a hot spot object on the display device, the hot spot object corresponding to the graphical object, for initiating a hot signal to the processor; and mapping the hot spot object to a color code displayable by the display device and uniquely associated with the hot spot object.

16. The method of claim 15 further comprising:

creating a functional object comprising an instruction executable by the processor in response to an activation signal from the input device; and mapping the functional object to the color code.

17. The method of claim 16 further comprising storing a first index in the memory device, the first index linking the functional object to the color code; and storing in the memory device a second index linking the color code to the hot spot object.

18. The method of claim 17 further comprising:

displaying the graphical object to a user;

positioning the cursor at a pixel within the hot spot object; and opening the functional object by actuating the input device while the cursor is positioned within the hot spot object.

19. The method of claim 18 further comprising:

executing the instruction corresponding to the functional object; and outputting a result corresponding to the instruction.

20. A memory device readable by a computer, the memory device comprising:

a first portion storing a first index linking a plurality of pixel numbers associated with a display device to a plurality of corresponding positions on the display device;

a second portion storing a second index linking a pixel number of the plurality of pixel numbers, stored in the first portion, with a color number corresponding to a color displayable by the display device; and a third portion storing a third index linking the color number to a functional object comprising an instruction executable by the computer.

* * * * *